United States Patent [19]

Liberty, II et al.

[11] Patent Number: 4,785,320
[45] Date of Patent: Nov. 15, 1988

[54] CAMERA LENS FOCUSING AID

[76] Inventors: Kenneth L. Liberty, II, 1314 Desert Rose Way, Olivenhain, Calif. 92024; Carl R. Christensen, 5412 Cottage Ave., San Diego, Calif. 92120

[21] Appl. No.: 91,386

[22] Filed: Aug. 31, 1987

[51] Int. Cl.$^4$ .......................... G03B 3/00; G03B 17/56
[52] U.S. Cl. .................................. 354/195.1; 354/295
[58] Field of Search ...................... 354/195.1, 286, 295

[56] References Cited

U.S. PATENT DOCUMENTS

| 2,093,282 | 9/1937 | Leity et al. | 354/195.1 |
| 2,496,408 | 2/1950 | Polanco | 354/295 |
| 3,251,285 | 5/1966 | Uterhart | 354/195.1 |

Primary Examiner—Michael L. Gellner
Attorney, Agent, or Firm—Lewis E. Massie

[57] ABSTRACT

A focusing aid that provides one finger rotational adjustment of the camera lens focusing ring. Easily attachable to the camera lens focusing ring the focusing aid uses a finger ring contoured to fit the tip of the operating finger to rotate the camera lens focusing ring by a single finger movement.

1 Claim, 1 Drawing Sheet

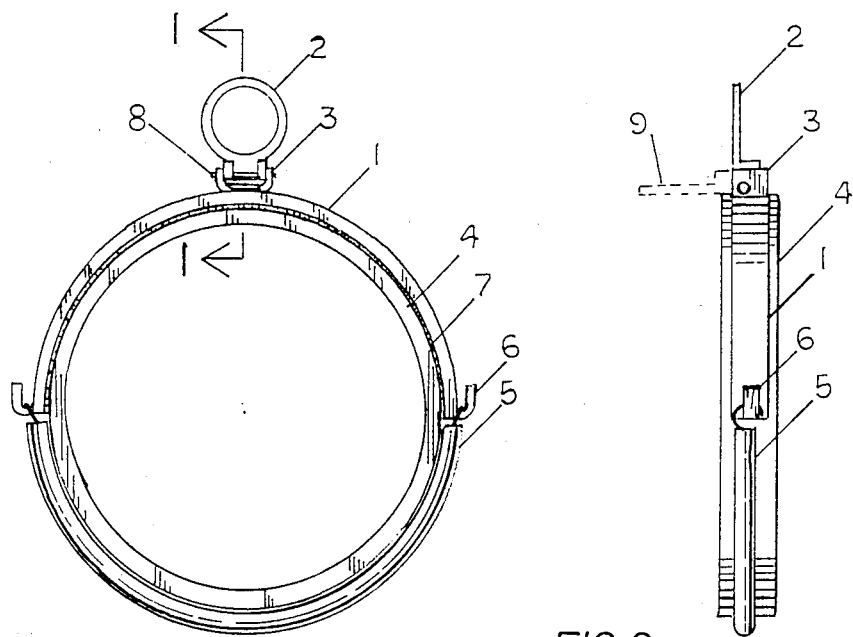
FIG.1
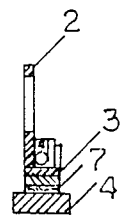
FIG.4
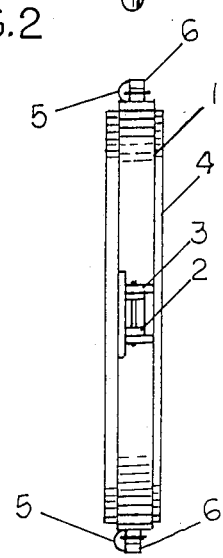
FIG.2
FIG.3

CAMERA LENS FOCUSING AID

BACKGROUND OF THE INVENTION

This invention relates to improvements in focusing aids for hand held cameras and telescopes. Focusing hand held cameras is accomplished by rotating the focusing ring on the camera lens mount. The present method for rotating the focusing ring is by grasping the ring by the thumb and one finger and rotating the ring. The principal object of the present invention is to provide a light weight focusing aid operated by one figure that can be quickly and easily attached to the focusing ring of most cameras and telescopes.

PRIOR ART

A search through the patent files of the Patent and Trademark Office has not revealed a similar invention. The single comparitive prior art is U.S. Pat. No. 2,496,408 relating to a camera diaphragm operating attachment.

SUMMARY OF THE INVENTION

The focusing aid is an attachment to the camera focusing ring that permits rotating the ring with one finger thus permitting the thumb and other fingers to stabilize the camera during exposure. The focusing aid of the present invention provides a finger tip ring that is attached to the focusing ring by a tension member. The ring is hinged at the point where it is attached to the focusing ring to permit folding it down parallel to the lens mount when the camera is placed into the carrying case.

BRIEF DESCRIPTION OF THE DRAWINGS

FIG. 1 is a front elevation view of the focusing aid attached to the camera focusing ring;

FIG. 2 is a right side view of the focusing aid attached to the camera focusing ring;

FIG. 3 is a top plan view of the focusing aid attached to the camera focusing ring;

FIG. 4 is a sectional view through 1—1 of FIG. 1.

DESCRIPTION OF THE PREFERRED EMBODIMENT

Refering to FIG. 1 the focusing aid consists of the finger operating ring 2 hinge mounted 3 to support band 1 which is attached to focusing ring 4 by tension spring 5 attached to the support 1 band by hooks 5. The interior surface of the support band 1 is covered by a plastic , or rubber , anti-slip material 7. The finger ring 2 rotates around hinge pin 8 in the hinge 3. In use the finger ring is in the vertical position as shown in FIGS. 1 and 2 and rotated to lie flat 9 on the lens mount for storage.

The present invention may be embodied in other specific forms without departing from the spirit or essential characteristics thereof.

What is claimed is:

1. A finger operable semi-circular band, or ring, frictionally attached to the camera lens focusing ring wherein the improvement comprises:
   a, the semicircular ring made of flexible metal or plastic,
   b, the flexible band having a width equal to, or less than, that of the focusing ring;
   c, the extremities of the ring having hook shaped attaching means;
   d, the semi-circular ring having a finger ring centrally attached to the outside periphery;
   e, the finger ring rotatably around the hinge pin axial to the semicircular ring;
   f, the hinge permitting rotation of the finger ring from a horizontal position parallel to the surface of the semicircular ring to a vertical position;
   g, the inside diameter of the finger ring conforming to the tip of a finger;
   h, a tension spring, or elastic band,circumferentially,attached, to the hookshaped attaching means on the semicircular ring; and,
   i, the length of the tension spring,or elastic band, being less than one half the circumference of the camera lens focusing ring.

* * * * *